UNITED STATES PATENT OFFICE.

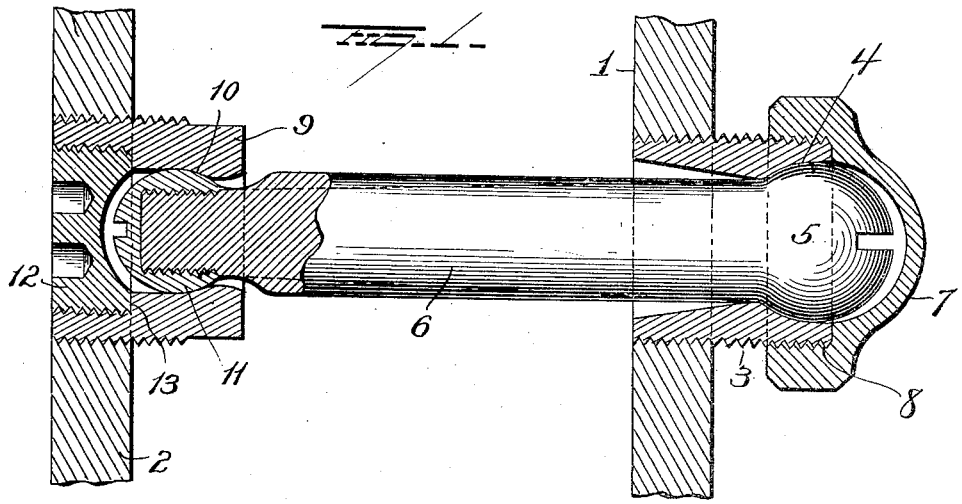
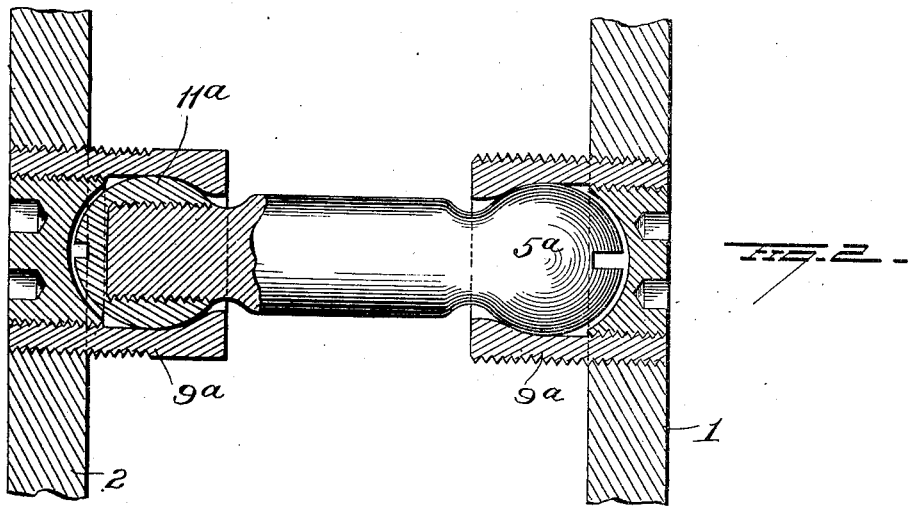

JOHN ROGERS FLANNERY, OF PITTSBURGH, PENNSYLVANIA, ASSIGNOR TO FLANNERY BOLT COMPANY, OF PITTSBURGH, PENNSYLVANIA.

FLEXIBLE STAY-BOLT FOR BOILERS.

1,111,691.  Specification of Letters Patent.  Patented Sept. 22, 1914.

Application filed May 5, 1913. Serial No. 765,589.

*To all whom it may concern:*

Be it known that I, JOHN ROGERS FLANNERY, of Pittsburgh, in the county of Allegheny and State of Pennsylvania, have invented certain new and useful Improvements in Flexible Stay-Bolts for Boilers; and I do hereby declare the following to be a full, clear, and exact description of the invention, such as will enable others skilled in the art to which it appertains to make and use the same.

My invention relates to an improvement in flexible stay bolts for boilers, and it consists in the details of construction and combination of parts as will be more fully described and pointed out in the claims.

In the accompanying drawings, Figure 1 is a view showing my improvement applied to the inner and outer sheets of a boiler, the connectors being shown in section, and Fig. 2 is a similar view of a modified form.

1 represents the outer sheet and 2 the inner sheet of a boiler, each of which is provided with a female threaded opening for the attachment of the connectors.

The connector in the outer sheet 1 comprises an externally threaded sleeve or bushing 3, provided internally adjacent its outer end, with a curved seat 4, conforming in shape to the spherical head 5 on the bolt 6, the inner end of the sleeve or bushing being internally flared so as to permit of free movement of the bolt in any direction. The outer end of the sleeve or bushing 3, is closed by a cap 7, having internal threads to engage the external threads at the outer end of the sleeve, and also provided with an annular shoulder 8, which latter abuts against the outer end of the sleeve. The inner face of the cap 7 is curved to conform to the contour of the spherical head 5, and normally is slightly removed from the head so as to provide for a slight expansion of the bolt.

The sleeve 3, as shown in Fig. 1 projects outwardly beyond the outer sheet sufficiently to carry the bearing 4 for the bolt head 5 into a plane beyond said sheet, while the sleeve 9 in which the opposite end of the bolt is mounted, is so located with relation to the inner sheet 2, that the bearing for the inner head is in a plane intermediate the two sheets. This sleeve 9 is threaded externally and is screwed into an opening in the inner sheet 2, with its outer end flush with the face of said sheet. It is provided internally with an integrally curved bearing 10 for the head 11 of the bolt, and internally threaded at its outer end for the reception of the cap 12, which, when in place, rests against the annular shoulder 13 of the sleeve 9, with its outer surface approximately flush with the outer face of the inner sheet 2. The inner face of cap 12 is curved to conform to the contour of the head 11 of bolt 6. This head 11 is smaller than head 5, and is provided with a threaded socket into which the threaded end of bolt 6 is screwed. The bolt may be cylindrical as shown in full lines or tapering as shown in dotted lines. To apply the bolt to its connectors or sleeves, the caps 7 and 12 of the sleeves, and the head 11 of the bolt are removed, and the bolt is passed through sleeve 3 and into sleeve 9 after which the head 11 is screwed onto the bolt and the caps 7 and 12 screwed into place.

In the construction shown in Fig. 2, the bolt is shortened up considerably and is mounted at its two ends in sleeves 9ª similar in all respects to the sleeve 9 of Fig. 1, so that both heads of the bolt are supported in planes intermediate the two sheets. In Fig. 2, the removal head 11ª is however approximately the same size as the integral head 5ª. The principal feature of this bolt is that it has spherical heads at both ends, which heads are mounted in substantially spherical bearings in the sleeves so as to compensate for the contraction and expansion which takes place in both sheets. Where the ball and socket principle of connection is applied to one sheet only, the opposite end of the bolt being threaded into the inner sheet, there is always slight movement in the threaded connection between the inner end of the bolt and the inner sheet, and while the movement is slight, a continuation of it will eventually cause leakage and crystallization of the metal in the bolt.

As the modern locomotives are gradually enlarging their fire boxes, there will naturally be greater expansion and contraction because of the greater surfaces exposed to the fire and cold air. By making both ends flexible this objection will be overcome, and by making both heads spherical, without projections of any kind, and the seats in the sleeves and cap of a radius to conform to the curve of the heads, any sediment that packs around the heads will simply reduce the size of the cavities without interfering in the least with the universal movement of the heads. With bolts having heads that are not spherical, the sediment or scale forming between the eccentric portion of the heads and the sleeves and caps, will in time, bind the heads so that there can be no movement of any kind, but with spherical heads and bearing conforming thereto, the sediment that settles around the head, while it may fill the cavity, cannot prevent the free movement of the spherical heads on their seats.

It is evident that many slight changes might be resorted to in the relative arrangement of parts shown and described without departing from the spirit and scope of my invention as set forth in the claim annexed. Hence I would have it understood that I do not wish to confine myself to the exact construction and arrangement of parts shown and described, but Having fully described my invention what I claim as new and desire to secure by Letters-Patent, is:—

In a stay bolt for boilers, the combination of a pair of oppositely disposed sleeves each open at its ends, and each provided with an integral internal curved seat, a stay bolt having two approximately spherical heads one of which is detachably secured to the bolt, the said heads resting against the curved seats in the sleeves, and caps for the sleeves, the inner faces of the caps being curved to conform to the contour of the heads and approximately concentric therewith.

In testimony whereof, I have signed this specification in the presence of two subscribing witnesses.

JOHN ROGERS FLANNERY.

Witnesses:
WM. F. MCNABB,
JOHN M. RONEY.